United States Patent
Luo et al.

(10) Patent No.: US 9,547,839 B2
(45) Date of Patent: Jan. 17, 2017

(54) METHOD AND SYSTEM UTILIZING USER-STATE-MONITORING OBJECTS AND RELEVANT DATA TO MONITOR AND PROVIDE CUSTOMER SERVICE ONLINE

(75) Inventors: Vicky W. Luo, Chengdu (CN); I-Jen Chiang, Taipei (TW); Te-Chang Huang, Taipei (TW)

(73) Assignee: NEWEGG INC., City of Industry, CA (US)

( * ) Notice: Subject to any disclaimer, the term of this patent is extended or adjusted under 35 U.S.C. 154(b) by 1345 days.

(21) Appl. No.: 12/710,972

(22) Filed: Feb. 23, 2010

(65) Prior Publication Data

US 2011/0022962 A1 Jan. 27, 2011

Related U.S. Application Data

(60) Provisional application No. 61/154,559, filed on Feb. 23, 2009.

(51) Int. Cl.
  *G06Q 10/10* (2012.01)
  *G06Q 30/02* (2012.01)
  *G06F 11/30* (2006.01)

(52) U.S. Cl.
  CPC ............. *G06Q 10/10* (2013.01); *G06Q 30/02* (2013.01); *G06F 11/30* (2013.01); *G06F 11/3072* (2013.01)

(58) Field of Classification Search
  CPC ....... G06F 11/30; G06F 11/3072; G06Q 10/10
  USPC .................................................. 715/789, 745
  See application file for complete search history.

(56) References Cited

U.S. PATENT DOCUMENTS

| | | | |
|---|---|---|---|
| 6,070,149 A | 5/2000 | Tavor et al. | |
| 6,976,056 B1 | 12/2005 | Kumar | |
| 7,152,018 B2 * | 12/2006 | Wicks | G06F 11/3409 702/186 |
| 7,840,428 B2 * | 11/2010 | McNab | G06Q 10/063 705/7.11 |
| 2001/0054064 A1 | 12/2001 | Kannan | |
| 2003/0018778 A1 | 1/2003 | Martin et al. | |
| 2003/0030666 A1 * | 2/2003 | Najmi | G06F 3/0482 715/745 |
| 2003/0167195 A1 * | 9/2003 | Fernandes | G06Q 10/06311 705/7.13 |
| 2008/0201242 A1 | 8/2008 | Minnis et al. | |
| 2008/0273224 A1 * | 11/2008 | Maulsby | G06Q 10/10 358/1.15 |

* cited by examiner

*Primary Examiner* — Sherrod Keaton
(74) *Attorney, Agent, or Firm* — The Webb Law Firm

(57) ABSTRACT

A system and method for providing customer service to a website user online, includes downloading a user-state-monitoring object and a user profile from a website to a client site when a website user loads up any web page through the website, wherein the user-state-monitoring object is configured to monitor and analyze the website user's behavioral patterns in real time by comparing the user's actions to a set of pre-defined business rules, and utilizing the user-state-monitoring object to notify an available customer service representative and enable communication between the customer service representative and the website user.

20 Claims, 3 Drawing Sheets

METHOD AND SYSTEM UTILIZING USER-STATE-MONITORING OBJECTS AND RELEVANT DATA TO MONITOR AND PROVIDE CUSTOMER SERVICE ONLINE

CROSS REFERENCE TO RELATED APPLICATIONS

This application claims the benefit of U.S. Provisional Patent Application No. 61/154,559 filed Feb. 23, 2009, and entitled "Method and System Utilizing User-State-Monitoring Objects and Relevant Data to Monitor and Provide Customer Service Online," the contents of which are incorporated herein by reference.

BACKGROUND OF THE INVENTION

Field of the Invention

The present invention relates to a system and method for providing customer service to website users.

Description of Related Art

As the Internet grows, the Internet has become a major vehicle for transportation of information regarding products and services. This arises because a person can easily obtain information on a variety of products and services from different vendors via the Internet. Hence many Web sites are becoming connected and more corporations are trying to do business on the "Web". Actually, the World Wide Web (WWW), which is now more often abbreviated as the "Web", has become an increasing popularity entertainment and information medium for consumers. The popularity of the WWW has led to the commercialization of this new medium. As credit card security problems are being resolved, the area of electronic sales or Electronic Commerce (e-commerce) has been developing rapidly. The new and exciting point about e-commerce is the ability of every one, almost anywhere on the globe to which a Web connection is available, to access any commercial business offerings catalog implemented as a Web site. Moreover, the user can access this service anytime, 24 hours a day, seven days a week. As a result, the WWW has become a significant commerce of E-commerce. Venders offer goods and services for sale via various WWW sites.

As described in U.S. Pat. No. 6,070,149, the contents of which is incorporated herein by reference in its entirety, the prior art provides a virtual sales person who is capable of assisting a computer user to complete an on-line sales transaction in a substantially similar manner as a human sales representative. A common practice world in actual physical stores is to have sales representatives or sales persons. These sales representatives or sales persons can help a customer to understand the product and its benefit to the customer, as well as enabling customer to find the needed product quickly. Additionally, the sales representatives or sales persons can advise the customer on the product related issues. Since the sales representative is also an employee of the store, the sales representative should also promote certain products according to the interest of the business and also sell as many products as possible. Unfortunately, when the customer wishes to buy a product through the Internet, only a menu and pictures are shown. No advice, no knowledge, no expertise, no confidence in the purchase is provided. One solution would be to add the Sales Representative function to the Internet virtual store. Currently, the merchant would need to hire 3 staff of human representatives for a 7 day work week, including holidays. Then, the merchant would need a chat system in a call center of some sort for enabling communication from these "human Sales Representatives to the users over the Web. Thus, this solution is difficult and expensive to implement. Therefore, in this invention, a virtual sales representative is provided for interacting with a customer browsing a virtual store Web site. However, the number of users is limited substantially only by the capacity of the server itself because the system is installed in a Web server and preferably serves many users simultaneously. The technology is constrained to being used in low volume sites. The problem that needs to be solved while catering to these sites is that while every attempt must be made to provide virtual sales person who is capable of assisting a computer user to complete an on-line sales transaction in a substantially similar manner as a human sales representative, it is virtually impossible to proportionally increase the capacity of the server itself to correspond to the number of simultaneous visitors on a high-volume website that could easily be a few tens of thousands of customers.

As described in U.S. Pat. No. 6,976,056, the contents of which is incorporated herein by reference in its entirety, there is an alternative technique to provide a system for establishing a live contact between visitors to a website and a representative of the company or organization or individual whose website is being visited. The invention combines the Web with instant message to allow website operators to monitor in real-time how many people are visiting sections of their website, from where and for how long and to proactively approach the visitor with an instant message, thereby engaging the visitor in a dialog with the company representative. The problem that needs to be solved while catering to these sites is that while every attempt must be made to provide website operators to monitor in real-time how many people are visiting sections of their website, from where and for how long and to proactively approach the visitor with an instant message, it is virtually impossible to proportionally increase the capacity of the server itself and sales representatives to monitor the website to correspond to the number of simultaneous visitors on a high-volume website that could easily be a few tens of thousands of customers. The technology is constrained to being used in low volume sites, simply because they require dedicated sales representatives to monitor the website in order to decide which users need to be offered customer service in a proactive manner.

As described in U.S. Pat. No. 6,976,056, there is an alternative technique to provide a priority-based system wherein Web site visitors are assigned Quality Points based on their interaction with the Web site in order to correctly identify the best users on a Web site that are most likely to generate sales, or are most needy of customer service. Hence the technology can adequately addresses the needs of high volume sites that wish to be proactive in the sale of high margin/cost products. In addition, the invention can provide the intelligent and timely allocation of appropriate Customer Service Representatives (or alternate service mechanisms) by matching a customer's behavioral patterns to the right Customer Service Representative (or other service agent) at the right time to achieve higher levels of customer service. The invention maybe cannot face the problem that it is virtually impossible to proportionally increase the volume of real staff to correspond to the number of simultaneous visitors on a high-volume website that could easily be a few tens of thousands of customers while every attempt must be made to provide proactive (Merchant-driven) customer service and sales. However, in this invention, the system and method just focus on providing sales and customer service to the top 2% of online customers and preferably the top 5%, or top 10% of Web site visitors that can be convinced to buy products online and potentially become paying customers. Besides, the number of users is limited substantially only by the capacity of the server itself because the system is installed in a Web server and preferably serves many users simultaneously. Hence, in this invention, the system and method also face the problem that the system needs enough capacity of the server to monitor the website to correspond to the number of simultaneous visitors on a high-volume website that could easily be a few tens of thousands of customers. It is virtually impossible to proportionally increase the capacity of the server itself and sales representatives to monitor the website to correspond to the number of simultaneous visitors on a high-volume website that could easily be a few tens of thousands of customers.

SUMMARY OF THE INVENTION

In one embodiment of the present invention, a system downloads associated user-state-monitoring objects and relevant data associated with user from the website to the client site in order to monitor and analyze website users' behavioral patterns in real time without proportionally increasing the capacity of the server itself and sales representatives to monitor the website to correspond to the number of simultaneous visitors on a high-volume website that could easily be a few tens of thousands of customers.

Another aspect of the present invention is to provide a system that downloads associated user-state-monitoring objects and relevant data associated with user from the website to the client site wherein the user-state-monitoring objects are utilized to monitor and analyze a website user's (or visitor's) behavioral patterns in real time by comparing the user's actions (and information derived thereof) to a set of pre-defined, merchant-specific business rules and makes customer service offer to the user only if the user satisfies the merchant's business rules and a suitable customer service representative (real or virtual) is online and available to deliver assistance to the user.

Another aspect of the present invention is to provide a system that downloads associated user-state-monitoring objects and relevant data associated with the user from the website to the client site wherein the user-state-monitoring objects are utilized to monitor and analyze a website user's (or visitor's) behavioral patterns in real time by comparing the user's actions (and information derived thereof) to a set of pre-defined, merchant-specific business rules and makes a sales or customer service offer to the user only if the user satisfies the merchant's business rules and a suitable customer service representative (real or virtual) is online and available to deliver a sales pitch or assistance to the user.

Another aspect of the present invention is to provide a system that downloads associated user-state-monitoring objects and relevant data associated with user from the website to the client site wherein the user-state-monitoring objects are utilized to monitor and analyze a website user's (or visitor's) behavioral patterns in real time by comparing the user's actions (and information derived thereof) to a set of pre-defined, merchant-specific business rules and notifies the available customer service representative only if the user accepts the customer service offer.

Another aspect of the present invention is to provide a system that downloads associated user-state-monitoring objects and relevant data associated with user from the website to the client site wherein the user-state-monitoring objects are utilized to monitor and analyze a website user's (or visitor's) behavioral patterns in real time by comparing the user's actions (and information derived thereof) to a set of pre-defined, merchant-specific business rules, notifies the available customer service representative only if the user accepts the customer service offer, and enables communication between the customer service representative and the user through a textual, audio or video interface.

Another aspect of the present invention is to provide a system that downloads associated user-state-monitoring objects and relevant data associated with user from the website to the client site wherein the user-state-monitoring objects are utilized to monitor and analyze a website user's (or visitor's) behavioral patterns in real time by comparing the user's actions (and information derived thereof) to a set of pre-defined, merchant-specific business rules, notifies the available customer service representative only if the user accepts the customer service offer, enables communication between the customer service representative and the user through a textual, audio or video interface, and tunes the set of pre-defined, merchant-specific business rules according to the response of the website users.

Accordingly, in order to accomplish the one or some or all above aspects, the present invention includes a method for providing customer service to a website user, comprising the steps of: (a) downloading a user-state-monitoring object and a user profile from a website to a client site when a website user loads up any web page through the website, wherein the user-state-monitoring object is utilized to monitor and analyze the website user's behavioral patterns in real time by comparing the user's actions to a set of pre-defined business rules; and (b) utilizing the user-state-monitoring object to notify an available customer service representative and enable communication between the customer service representative and the website user.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention. The various numerical instances disclosed herein are not to be considered as limiting.

Figure 1A:
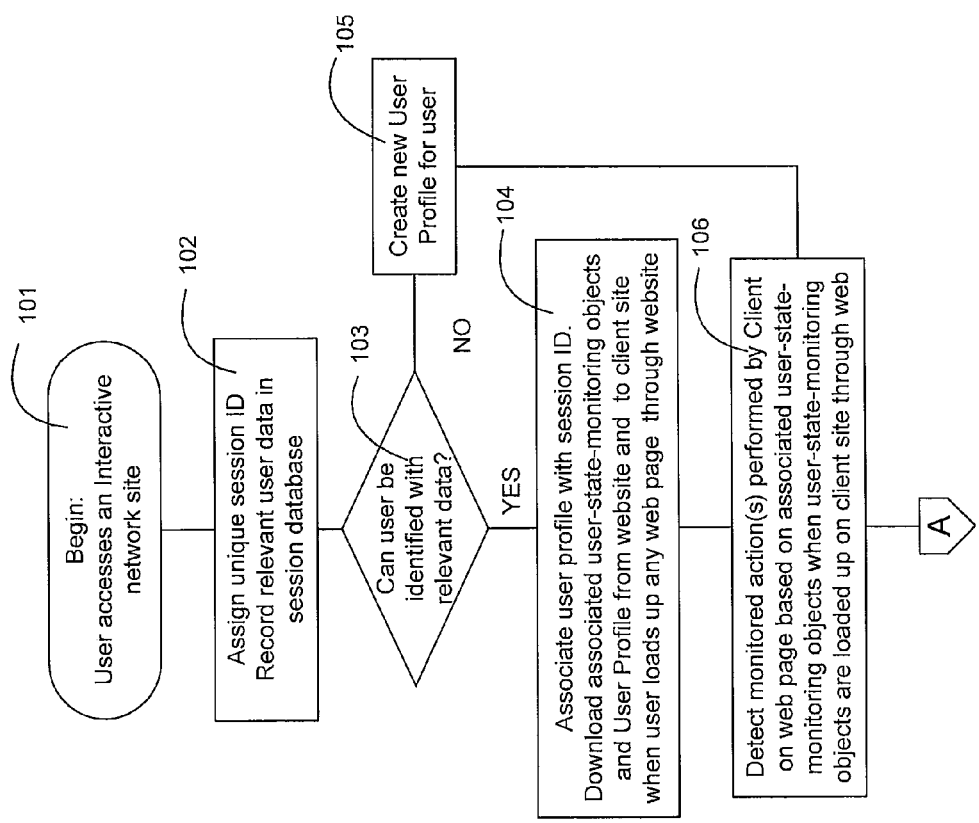
FIGS. 1A-1B show a flow diagram depicting a general system approach according to one embodiment of the present invention.
Figure 1B:
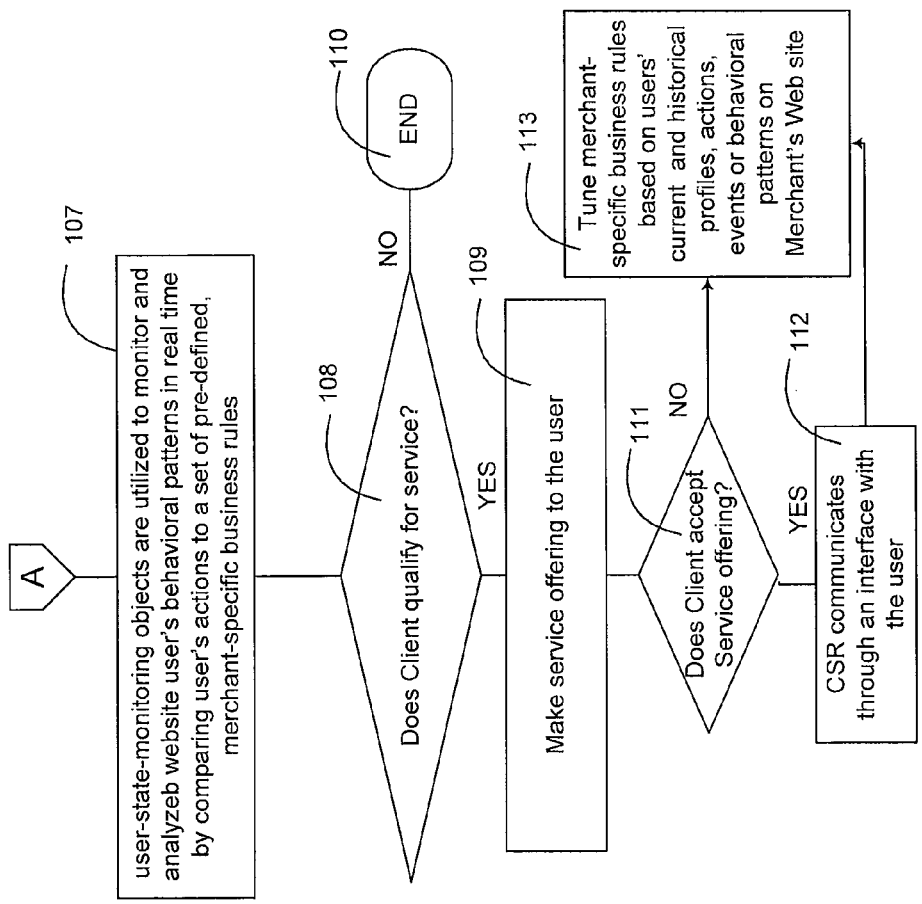

Referring to FIGS. 1A-1B, a flow diagram depicting a general system approach according to one embodiment of the present invention is illustrated. As shown in FIGS. 1A-1B, operation begins at a stage 102 in response to a new user initiating access (for example, accessing a website) to an interactive network site. At stage 102, a unique session ID (identifier) is assigned from a front-end session database, and relevant user data is recorded in the session database associated with the session ID.

In stage 103, an attempt is made to identify the user by using the relevant information obtained in stage 102 using techniques familiar to one of ordinary skill in the art (e.g. login identifier, cookies, Internet Protocol (IP) address, etc.). In the one embodiment, the cookie identifier is used as a primary key to the User Profile Database to obtain the profile of the user, if available. The operation stages 102 and 103 are similar to the disclosure as described in U.S. Pat. No. 6,976,056.

In stage 104, if a user profile is found, it is associated with the session ID. The user profile contains the relevant data associated with the user based on his interactions with the website on previous occasions. The system downloads user-state-monitoring objects and the user profile from the website to the client site when the user loads up any web page through the website. The user-state-monitoring objects are utilized to monitor and analyze a website user's (or visitor's) behavioral patterns in real time by comparing the user's actions (and information derived thereof) to a set of pre-defined, merchant-specific business rules. These user-state-monitoring objects contain the appropriate name of the event and parameters, wherein the parameters and the set of pre-defined, merchant-specific business rules can determine whether a suitable customer service representative (real or virtual) is online and available to deliver assistance to users. In a scenario, the user-state-monitoring object may contain the name of the event, IDLE_TIME_ON_WEB_PAGE and the parameters t (time on the web page) and u (URL of the web page) associated with the corresponding action when every user is idle on the web page. If a user spends an idle time, say 25 seconds, on a web page, an event is generated that passes the parameters t and u to the Session Management and then the parameters t and u are stored in the User Profile Database. The user-state-monitoring object notifies the available customer service representative and enables communication between the customer service representative and the user through a textual, audio or video interface only if the user accepts the customer service offer. For example, while still referring to the action, IDLE_TIME_ON_WEB_PAGE, the rule may be such that if t>25 seconds, the user-state-monitoring object notifies the available customer service representative and enables communication between the customer service representative and the user through a textual, audio or video interface;

else the user-state-monitoring object does not notify the available customer service representative and enable communication between the customer service representative and the user through a textual, audio or video interface.

However, the 25 seconds idle time may be tuned by the response of the user. For example, if the user denies accepting the customer service offer, the idle time will be added over 25 seconds, say 30 seconds. The rule may be changed such that if t>30 seconds, the user-state-monitoring object notifies the available customer service representative and enables communication between the customer service representative and the user through a textual, audio or video interface;

else the user-state-monitoring object does not notify the available customer service representative and enable communication between the customer service representative and the user through a textual, audio or video interface.

In addition, if almost all users, say 80% of users accessing the web page, spend a specific idle time on a web page, the user-state-monitoring object notifies the available customer service representative and enables communication between the customer service representative and the user through a textual, audio or video interface but almost users deny accepting the customer service offer. The user-state-monitoring object may delete the pre-defined rule to provide the service of notifying the available customer service representative "and enabling communication between the customer service representative and the user through a textual, audio or video interface when a user accesses the web page and spends a specific idle time on a web page. The different web pages may contain different user-state-monitoring objects for different purposes.

Stage 105 occurs when there is no user profile associated with a user. The system interprets the absence of any profile as an indication of a first-time user. The front-end session database may then create a new profile for the user and the user is associated with the appropriate relevant data.

In stage 106, the user performs an action on the web site. These actions include all actions that can be monitored on the user interface such as mouse movements, mouse activity and inactivity, clicks on images, buttons or links, or hesitation on a particular web page or field in the form filling process. A variety of client side event-monitoring technologies such as JavaScript can be used to detect user actions. In stage 107, the relevant action information of the user is monitored and analyzed by the user-state-monitoring objects in real time and then the user's actions (and information derived thereof) is compared to a set of pre-defined, merchant-specific business rules. The relevant action information includes the action name and the parameters associated with the action name. One with ordinary skill in the art may potentially use a lava Applet and Java networking APIs to post the event information it receives via a JavaScript-Java communication mechanism to the Session Management subsystem in a manner that is transparent to the user and does not necessitate page reloads on the user interface, which is a web browser in the current embodiment.

Figure 2:
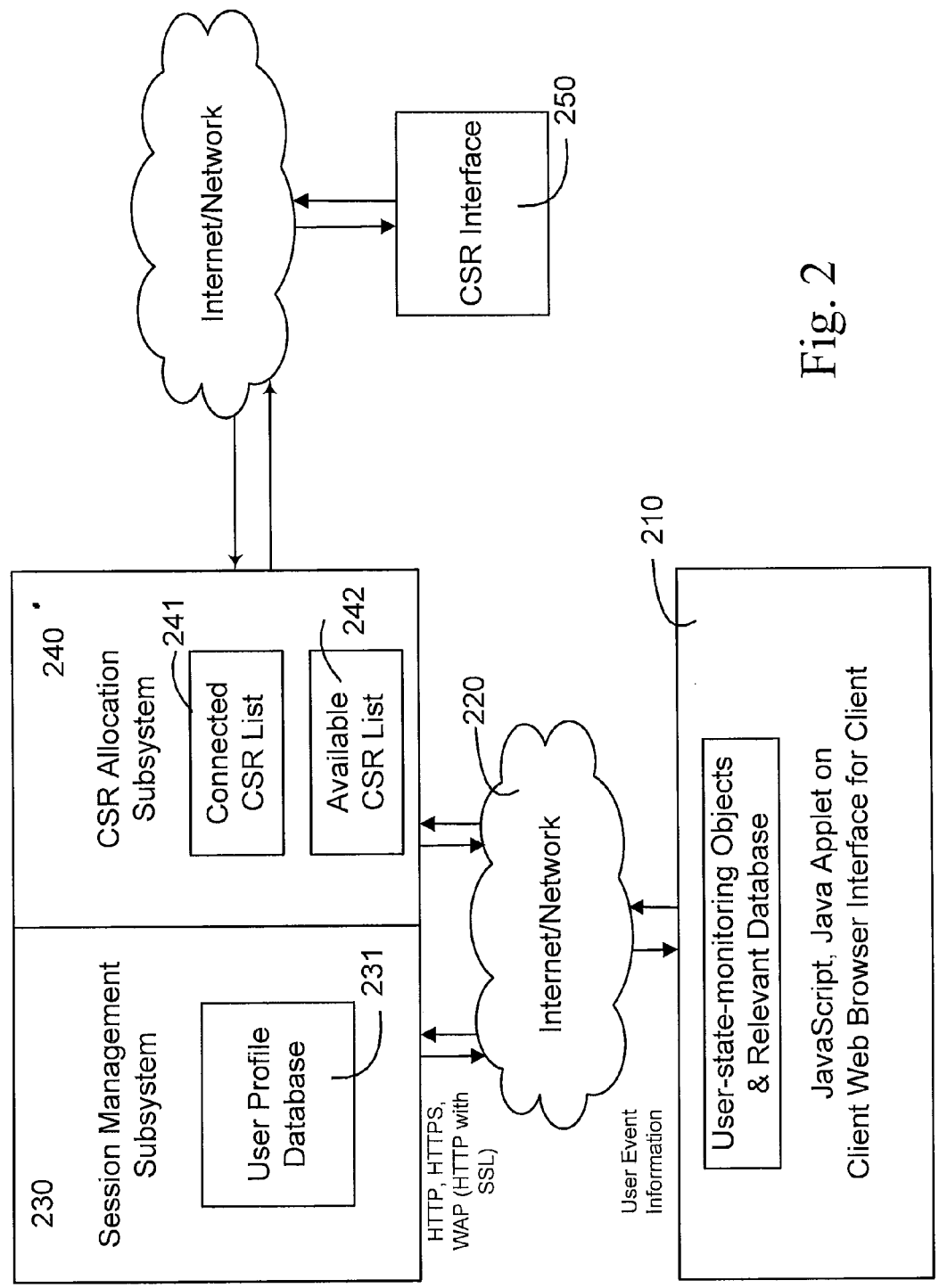
FIG. 2 shows a block diagram depicting a general system approach according to the one embodiment of the present invention.

Stages 108 and 109 occur when the user qualifies for customer service and a service offer is made to the user in accordance with the instructions from the customer service representative (CSR) Allocation subsystem 240 (shown in FIG. 2). Stage 111 occurs when the user clicks on the service offer to indicate acceptance of the service offer or customer service. In stage 112, if the user accepts the service offer, the CSR Allocation subsystem 240 utilizes the Connected CSR list 241 and Available CSR List 242 (shown in FIG. 2) to notify one of the customer service representatives to enable communication between the customer service representative and the user through a textual, audio or video interface in real-time. At this point, the chat window opens and a message appears in the window indicating that a suitable CSR is being sought. In stage 113, the set of pre-defined, merchant-specific business rule may be tuned based on the user's actions (and information derived thereof) after the user accepts the service offer or denies to accept the service offer.

Referring to FIG. 2, a block diagram depicting a general system approach according to one embodiment of the present invention is illustrated. As shown in FIG. 2, the user surfs a web site using a Web browser 210 on his computer or other Internet client. The system downloads user-state-monitoring objects and the user profile, which is retrieved from the User Profile Database 231, from the website to the client site when the user loads up any web page through the website. In other words, the parameters associated with the user by virtue of his online behavioral patterns along with the "events" that he has triggered during his web surfing experience are sent through the Internet/Network 220 from the Session Management subsystem 230 to the client site. The client site then obtains historical user information (if available) by referring to the User Profile Database 231 and retrieves the last user profile associated with the user (if any). The user-state-monitoring objects are utilized to monitor and analyze a website user's (or visitor's) behavioral patterns in real time by comparing the user's actions (and information derived thereof) to a set of pre-defined, merchant-specific business rules. These user-state-monitoring objects contain the appropriate name of the event and parameters, wherein the parameters and the set of pre-defined, merchant-specific business rules can determine whether a suitable customer service representative (real or virtual) is online and available to deliver assistance to users. In a scenario, the user-state-monitoring object may contain the name of the even, IDLE_TIME_ON_WEB_PAGE and the parameters t (time on the web page) and u (URL of the web page) associated with the corresponding action when every user is idle on the web page. If a user spends an idle time, say 25 seconds, on a web page, an event is generated that passes the parameters t and u to the Session Management and then the parameters t and u are stored in the User Profile Database. The user-state-monitoring object notifies the available customer service representative (CSR) Allocation subsystem 240 and the CSR Allocation subsystem 240 provides a service offer to the user. The CSR Allocation subsystem maintains the state of the CSRs in terms of the Connected CSR list 241 and Available CSR List 242. If the user accepts the service offer, the CSR Allocation subsystem 240 utilizes the Connected CSR list 241 and Available CSR List 242 to notify one of the customer service representatives to communicate with the user in real-time. The CSR Interface 250 is the communication interface that runs on the CSRs' computers so that they may communicate with users in real-time. In other words, the user-state-monitoring object notifies the available customer service representative and enables communication between the customer service representative and the user through a textual, audio or video interface only if the user accepts the customer service offer. For example, while still referring to the action, IDLE_TIME_ON_WEB_PAGE, the rule may be such that if t is greater than 25 seconds, the user-state-monitoring object notifies the available customer service representative (CSR) Allocation subsystem 240 and the CSR Allocation subsystem 240 provides a service offer to the user. If the user accepts the service offer, the CSR Allocation subsystem 240 utilizes the Connected CSR list 241 and Available CSR List 242 to notify one of customer service representative to enable communication between the customer service representative and the user through a textual, audio or video interface in real-time.

However, the 25 seconds idle time can be tuned by the response of the user. For example, if the user denies accepting the customer service offer, the idle time will be added over 25 seconds, say 30 seconds. The rule may be changed such that if t>30 seconds, the user-state-monitoring object notifies the available customer service representative (CSR) Allocation subsystem 240 and the CSR Allocation subsystem 240 provides a service offer to the user. If the user accepts the service offer, the CSR Allocation subsystem 240 utilizes the Connected CSR list 241 and Available CSR List 242 to notify one of the customer service representatives to enable communication between the customer service representative and the user through a textual, audio or video interface in real-time.

In addition, if almost all users, say 80% of users accessing the web page, spend a specific idle time on a web page, the user-state-monitoring object notifies the available customer service representative and enables communication between the customer service representative and the user through a textual, audio or video interface but almost users deny accept the customer service offer. The user-state-monitoring object may delete the pre-defined rule to provide the service of notifying the available customer service representative and enabling communication between the customer service representative and the user through a textual, audio or video interface when a user accesses the web page and spends a specific idle time on a web page. The different web pages may contain different user-state-monitoring objects for different purposes.

Generally, the present invention provides for a system that downloads associated user-state-monitoring objects and relevant data associated with a user from the website to the client site, wherein the user-state-monitoring objects are utilized to monitor and analyze a website user's (or visitor's) behavioral patterns in real time by comparing the user's actions (and information derived thereof) to a set of pre-defined, merchant-specific business rules, notifies the available customer service representative only if the user accepts the customer service offer, enables communication between the customer service representative and the user through a textual, audio or video interface, and tunes the set of pre-defined, merchant-specific business rules according to the response of the website users. In one embodiment, the server need not monitor the website users' behavioral patterns in real time in response to the number of simultaneous visitors on a high-volume website that could easily be a few tens of thousands of customers. In one embodiment, the system may establish an intelligent and timely allocation of appropriate Customer Service Representatives (or alternate service mechanisms) by matching a user's behavioral patterns to the right Customer Service Representative (or other service agent) at the right time because the set of pre-defined, merchant-specific business rules can be tuned according to the response of the website users. Therefore, the present invention utilizes a simple way, e.g., the download of the associated user-state-monitoring objects and relevant data associated with a user from the website to the client site, to monitor and analyze website users' behavioral patterns in real time to overcome the difficulty to proportionally increase the capacity of the server itself and sales representatives to monitor the website to correspond to the number of simultaneous visitors on a high-volume website that could easily be a few tens of thousands of customers, for example, or any high amount.

The methods and systems described herein may be deployed in part or in whole through a machine that executes computer software program codes, and/or instructions on a processor. The processor may be part of a server, client, network infrastructure, mobile computing platform, stationary computing platform, or other computing platform. The processor may be communicatively connected to the Internet or any other distributed communications network via a wired or wireless interface. The processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention and are not to be construed as limiting the scope of the invention.

The invention claimed is:

1. A system for providing customer service to a website user, comprising at least one processor and memory, the system further comprising:
    (a) a session management subsystem including a user profile database for downloading a user-state-monitoring object and a user profile retrievable from the user profile database from a website to a client site when a website user loads up a web page through the website, wherein the user-state-monitoring object is configured to monitor and analyze the website user's behavioral patterns in real time by comparing the website user's actions to a set of pre-defined business rules; and
    (b) a customer service representative allocation subsystem for receiving a notification from the user-state-monitoring object, configured to notify an available customer service representative associated with the website, and configured to enable communication between the available customer service representative and the website user if the website user's actions match the pre-defined business rules.

2. The system for providing customer service to a website user, as recited in claim 1, wherein the pre-defined business rules are tuned according to the response of the website user.

3. The system for providing customer service to a website user, as recited in claim 1, wherein the pre-defined business rules are tuned if the website user's actions match the pre-defined business rules and a specific percentage of website users deny accepting a customer service offer provided by the system.

4. The system for providing customer service to a website user, as recited in claim 1, wherein the user-state-monitoring object is configured to enable communication between the customer service representative and the website user through a textual, audio, or video interface.

5. The system for providing customer service to a website user, as recited in claim 2, wherein the user-state-monitoring object is configured to enable communication between the customer service representative and the website user through a textual, audio, or video interface.

6. The system for providing customer service to a website user, as recited in claim 3, wherein the user-state-monitoring object is configured to enable communication between the customer service representative and the website user through a textual, audio, or video interface.

7. A method for providing customer service to a website user, comprising the steps of:
    (a) downloading a user-state-monitoring object and a user profile from a website to a client site when a website user loads up a web page through the website, wherein the user-state-monitoring object is configured to monitor and analyze the website user's behavioral patterns in real time by comparing the user's actions to a set of pre-defined business rules; and (b) utilizing the user-state-monitoring object to notify an available customer service representative associated with the website and enabling communication between the customer service representative and the website user.

8. The method for providing customer service to a website user, as recited in claim 7, wherein the pre-defined business rules are tuned according to the response of the website user.

9. The method for providing customer service to a website user, as recited in claim 7, wherein the pre-defined business rules are tuned if the website user's actions match the pre-defined business rules and a specific percentage of website users deny accepting a customer service offer provided by the system.

10. The method for providing customer service to a website user, as recited in claim 7, wherein the user-state-monitoring object is configured to enable communication between the customer service representative and the website user through a textual, audio or video interface.

11. The method for providing customer service to a website user, as recited in claim 8, wherein the user-state-monitoring object is configured to enable communication between the customer service representative and the website user through a textual, audio, or video interface.

12. The method for providing customer service to a website user, as recited in claim 9, wherein the user-state-monitoring object is configured to enable communication between the customer service representative and the website user through a textual, audio, or video interface.

13. A method for providing customer service to a website user, comprising the steps of:
   (a) downloading a user-state-monitoring object and a user profile from a website to a client site when a website user loads up a web page through the website, wherein the user-state-monitoring object is configured to monitor and analyze the website user's behavioral patterns in real time by comparing the user's actions to a set of pre-defined business rules;
   (b) utilizing the user-state-monitoring object to notify an available customer service representative allocation subsystem and then the customer service representative allocation subsystem providing a service offer to the website user; and
   (c) utilizing the customer service representative allocation subsystem to notify an available customer service representative associated with the website and enabling communication between the customer service representative and the website user if the website user accepts the service offer.

14. The method for providing customer service to a website user, as recited in claim 13, wherein the pre-defined business rules are tuned according to the response of the website user.

15. The method for providing customer service to a website user, as recited in claim 13, wherein the pre-defined business rules are tuned if the website user's actions match the pre-defined business rules and a specific percentage of website users deny accepting a customer service offer provided by the system.

16. The method for providing customer service to a website user, as recited in claim 13, wherein the user-state-monitoring object is configured to enable communication between the customer service representative and the website user through a textual, audio, or video interface.

17. The method for providing customer service to a website user, as recited in claim 14, wherein the user-state-monitoring object is configured to enable communication between the customer service representative and the website user through a textual, audio, or video interface.

18. The method for providing customer service to a website user, as recited in claim 15, wherein the user-state-monitoring object is configured to enable communication between the customer service representative and the website user through a textual, audio, or video interface.

19. The system for providing customer service to a website user, as recited in claim 1, wherein the user-state-monitoring object is configured to tune the pre-defined business rules according the website user's actions by modifying a parameter associated with a website user's action, such that a subsequent event generated by the user-state-monitoring object associated with the website user's actions for notifying an available customer service representative is based at least partially on a modified parameter.

20. The system for providing customer service to a website user, as recited in claim 1, wherein the session management subsystem downloads a different user-state-monitoring object from the website to the client site when the website user loads up a different web page through the website.

* * * * *